(12) United States Patent
Fuju

(10) Patent No.: US 8,892,832 B2
(45) Date of Patent: Nov. 18, 2014

(54) STORAGE APPARATUS, STORAGE MANAGEMENT METHOD, AND STORAGE MEDIUM STORING STORAGE MANAGEMENT PROGRAM

(75) Inventor: Takashi Fuju, Tokyo (JP)

(73) Assignee: NEC Corporation, Tokyo (JP)

( * ) Notice: Subject to any disclaimer, the term of this patent is extended or adjusted under 35 U.S.C. 154(b) by 534 days.

(21) Appl. No.: 13/143,396

(22) PCT Filed: Jan. 19, 2010

(86) PCT No.: PCT/JP2010/000250
§ 371 (c)(1),
(2), (4) Date: Jul. 6, 2011

(87) PCT Pub. No.: WO2010/098009
PCT Pub. Date: Sep. 2, 2010

(65) Prior Publication Data
US 2012/0124284 A1    May 17, 2012

(30) Foreign Application Priority Data
Feb. 25, 2009    (JP) .................................. 2009-042538

(51) Int. Cl.
G06F 12/00    (2006.01)
G06F 11/14    (2006.01)
G06F 12/08    (2006.01)

(52) U.S. Cl.
CPC ........ *G06F 11/1466* (2013.01); *G06F 12/0804* (2013.01)
USPC ........... 711/162; 711/165; 711/112; 711/161; 711/163; 711/E12.082

(58) Field of Classification Search
None
See application file for complete search history.

(56) References Cited

U.S. PATENT DOCUMENTS

2006/0143412 A1*    6/2006    Armangau .................... 711/162

FOREIGN PATENT DOCUMENTS

| JP | 10-198607 A | 7/1998 |
|---|---|---|
| JP | 11-73732 A | 3/1999 |
| JP | 2000330729 A | 11/2000 |
| JP | 2003099306 A | 4/2003 |
| JP | 2005275582 A | 10/2005 |

OTHER PUBLICATIONS

International Search Report for PCT/JP2010/000250 mailed Apr. 6, 2010.

* cited by examiner

*Primary Examiner* — Matthew Bradley
*Assistant Examiner* — Arvind Talukdar
(74) *Attorney, Agent, or Firm* — Sughrue Mion, PLLC

(57) ABSTRACT

Provided are a storage apparatus, a storage management method, and a storage management program capable of performing a backing-up operation under the condition that a host computer is in operation. A storage apparatus 1 according to the present invention includes a cache memory 20, a storage device 30 that stores data, a data copy unit 12 that copies the data to be stored in the storage device 30 in a storage device for duplication 40, and a control unit 11 in which, when writing data in the storage device 30, if the data copy unit 12 is executing a separation copy which does not allow data rewriting during copying, the data to be written in the storage device 30 is stored in the cache memory 20, and after completing the separation copy, the data stored in the cache memory 20 is written in the storage device 30.

9 Claims, 13 Drawing Sheets

DIFFERENCE MANAGEMENT TABLE

| LD NUMBER | Addr | LOGIC DIFFERENCE FLAG | SEPARATION COPY UNCOMPLETED FLAG | DISK UNREFLECTED FLAG |
|---|---|---|---|---|
| 0 | 0 | 0 | 0 | 0 |
| 0 | 1 | 1 | 0 | 0 |
| 1 | 0 | 0 | 0 | 0 |
| 1 | 1 | 0 | 1 | 0 |
| 1 | 2 | 1 | 1 | 1 |
| 1 | 3 | 1 | 0 | 1 |
| 1 | 4 | 1 | 0 | 0 |

Fig. 3A

LD MANAGEMENT TABLE

| LD NUMBER | LD OPERATION STATE |
|---|---|
| 0 | UNDER SEPARATION |
| 1 | SEPARATION COMPLETED |
| 2 | UNDER SYNCHRONIZATION |
| 3 | SYNCHRONIZATION COMPLETED |

Fig. 3B

STORAGE APPARATUS, STORAGE MANAGEMENT METHOD, AND STORAGE MEDIUM STORING STORAGE MANAGEMENT PROGRAM

This application is the National Phase of PCT/JP2010/000250, filed Jan. 19, 2010, which claims the benefit of priority, and incorporates herein by reference in its entirety, the following Japanese Patent Application No. 2009-042538 filed on Feb. 25, 2009.

TECHNICAL FIELD

The present invention relates to a storage apparatus, a storage management method, and a storage medium storing a storage management program.

BACKGROUND ART

A technique is known to copy data stored in a hard disk of a storage apparatus onto a hard disk for duplication of a remote storage apparatus for a backing-up operation in order to improve reliability of data.

Such a backing-up operation includes copying data in a hard disk (hereinafter referred to as "master disk") which is a copy source at the time at which the copy is instructed onto a hard disk for duplication (hereinafter referred to as "duplicate disk"). Such type of copy is called "separation". In other words, the separation is to generate a snap shot image of the master disk at the time of instruction in a duplicate disk.

By the way, a method of backing up data includes a method of reading out data directly from a master disk and copying the data that is read out onto a duplicate disk without providing other resource than the master disk to store the data copied onto the duplicate disk. However, when the storage apparatus receives a write request of data from the host computer to the master disk while executing copy by separation in a storage apparatus that employs such a method, it is impossible to write data into the master disk before completion of separation. This is because it is required to keep the state of the master disk at the time of instruction for separation until completion of copy by separation.

In this case, the host computer needs to suspend writing processing into the master disk until completion of separation. Thus, the task that is executed in the host computer is stopped. Further, when processing in the host computer is prioritized, the separation needs to be interrupted. In summary, the problem is that it is impossible to execute a backing-up operation under the condition that a host computer is in operation.

Patent literature 1 discloses a technique of comparing the latest sequence number added to Write request data of a primary site with the latest sequence number written into a cache of a secondary site at the time of start of a backing-up operation of the remote volume, to enable synchronization establishment between a disk array device of the primary site and a disk array device of the secondary site at the time of start of the backing-up operation of the remote volume, thereby performing a backing-up operation of the remote volume.

Further, Patent literature 2 discloses a technique of realizing overwrite on a record of data which is not yet transferred to a secondary disk controller during a specified time in a primary disk controller, to reduce the data amount of the transfer data from the primary disk controller to the secondary disk controller when performing remote copy, so as to assure the data integrity.

Further, Patent literature 3 discloses a technique of making it possible to variably set a differential data amount threshold value to manage a differential data amount which is the update data not yet reflected from a master side system to a slave side system, to control a timing to execute data transfer to reflect the difference data in the slave side system, thereby minimizing reduction in information processing capability of the system itself.

Furthermore, Patent literature 4 discloses a technique in which, while there is data to be changed when a recording means that temporarily stores data to be recorded in a non-volatile recording medium stores data in the non-volatile recording medium, the data writing to the non-volatile recording medium is suspended, so that the number of times of data writing into the non-volatile recording medium is reduced, thereby achieving prompt processing of changing data.

However, neither of the above Patent literatures 1 to 4 discloses a technique of separation.

CITATION LIST

Patent Literature

Patent Literature 1
Japanese Unexamined Patent Application Publication No. 2003-099306
Patent Literature 2
Japanese Unexamined Patent Application Publication No. 2005-275582
Patent literature 3
Japanese Unexamined Patent Application Publication No. 10-198607
Patent Literature 4
Japanese Unexamined Patent Application Publication No. 11-073732

SUMMARY OF INVENTION

Technical Problem

As described in the background art, there is a problem in the storage apparatus that it cannot perform a backing-up operation under the condition that a host computer is in operation.

The present invention has been made to solve the problem stated above, and an object of the present invention is to provide a storage apparatus, a storage management method, and a storage medium storing a storage management program that are capable of performing a backing-up operation under the condition that a host computer is in operation.

Solution to Problem

A storage apparatus according to the present invention includes: a cache memory; a storage device that stores data; a data copy means that copies data to be stored in the storage device onto a storage device for duplication; and a control means in which, when writing data in the storage device, if the data copy means is executing a separation copy which does not allow data rewriting during copying, the data to be written in the storage device is stored in the cache memory, and after completing the separation copy, the data stored in the cache memory is written in the storage device.

A storage management method according to the present invention includes: judging whether separation copy which does not allow data rewriting during copying is being executed when writing data in a storage device; storing data to be written into the storage device in a cache memory when the separation copy is being executed; and writing data stored in the cache memory in the storage device after completion of the separation copy.

A storage medium storing a storage management program according to the present invention causes a computer to execute the following processing of: judging whether separation copy which does not allow data rewriting during copying is being executed when writing data in a storage device; storing data to be written into the storage device in a cache memory when the separation copy is being executed; and writing data stored in the cache memory in the storage device after completion of the separation copy.

Advantageous Effects of Invention

According to the present invention, it is possible to provide a storage apparatus, a storage management method, and a storage medium storing a storage management program that are capable of performing a backing-up operation under the condition that a host computer is in operation.

BRIEF DESCRIPTION OF DRAWINGS

FIG. 3A is a diagram showing an example of a difference management table according to the exemplary embodiment of the present invention;

FIG. 3B is a diagram showing an example of an LD management table according to the exemplary embodiment of the present invention;

DESCRIPTION OF EMBODIMENTS

Hereinafter, an exemplary embodiment of the present invention will be described with reference to the accompanying drawings.

Note that "separation" according to the exemplary embodiment of the present invention means to copy data in a storage device which is the copy source at the time at which copy is instructed onto a storage device for duplication. In summary, the target for processing by separation is not limited to a hard disk but includes a storage device such as a hard disk and a flash memory.

Figure 1:
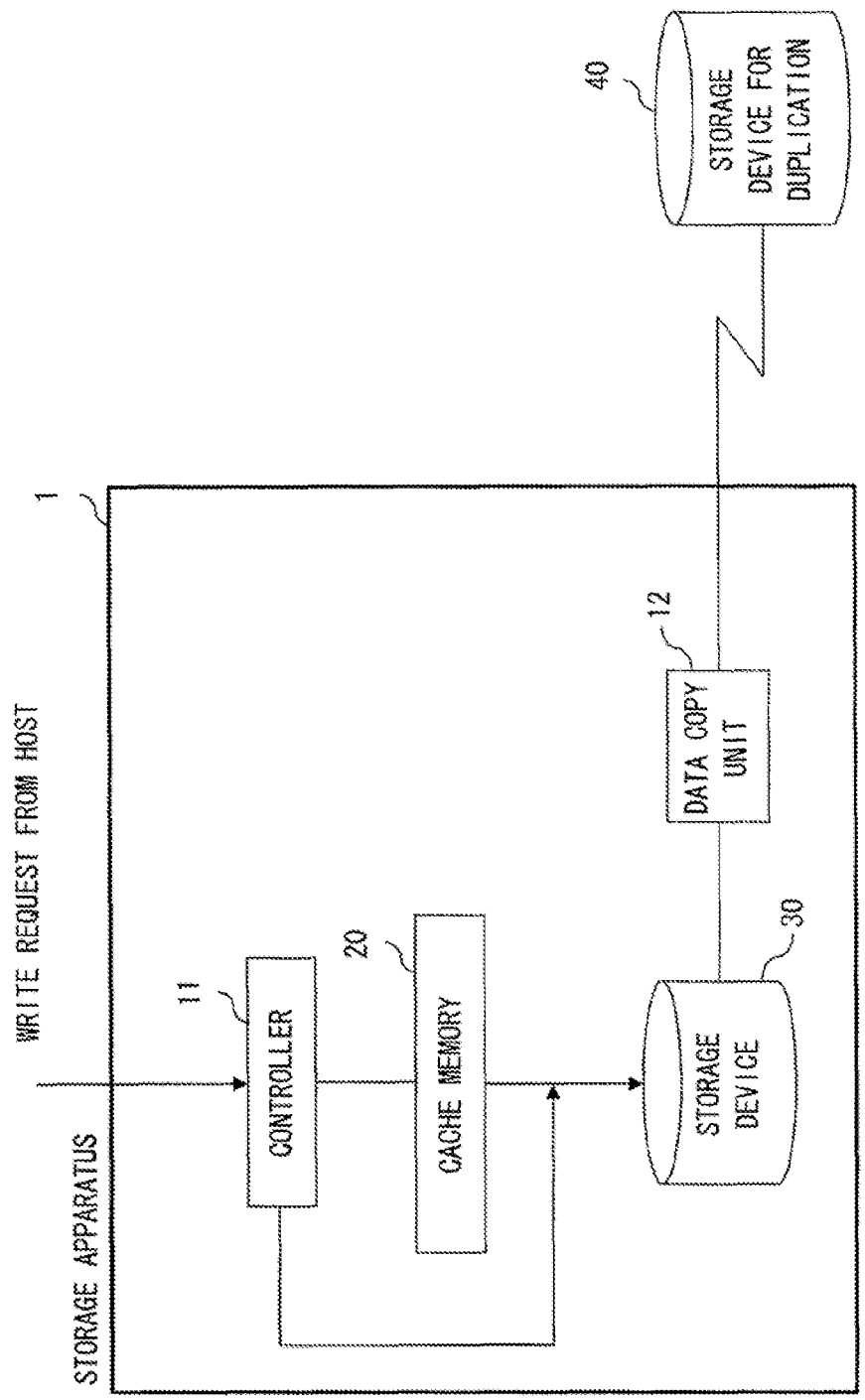
FIG. 1 is a block diagram showing a summary of a storage apparatus according to an exemplary embodiment of the present invention.

Referring first to FIG. 1, a summary of a storage apparatus according to the exemplary embodiment of the present invention will be described. FIG. 1 is a block diagram showing a summary of the storage apparatus according to the exemplary embodiment of the present invention.

A storage apparatus 1 includes a controller 11, a data copy unit 12, a cache memory 20, and a storage device 30. Further, a storage apparatus 1 is connected to a storage device for duplication 40.

The controller 11 stores, when data is written into the storage device 30 according to a write request from a host computer (hereinafter referred to as "host"), if the data copy unit 12 is executing a separation copy which does not allow data rewriting during copying, the data to be written in the storage device 30 in the cache memory 20, and after completion of the separation copy, stores the data stored in the cache memory 20 in the storage device 30.

The data copy unit 12 performs processing to copy the data to be stored in the storage device 30 onto the storage device for duplication 40.

The cache memory 20 stores data that is to be written into the storage device 30.

The storage device 30 stores data which is read out from or written into the host computer.

The storage device for duplication 40 stores the copy of the data stored in the storage device 30.

Subsequently, a summary of processing of the storage apparatus according to the exemplary embodiment of the present invention will be described.

First, upon acquiring write request output from the host, the controller 11 judges whether the separation copy is being executed.

When the separation copy is not being executed, the controller 11 writes data in the storage device 30. At this time, the controller 11 may directly write data to the storage device 30. Alternatively, the controller 11 may store data in the cache memory 20, and write data stored in the cache memory 20 into the storage device 30.

When the separation copy is being executed, the controller 11 stores data in the cache memory 20. Then, the controller 11 writes data stored in the cache memory 20 into the storage device 30 after the completion of the separation copy executed by the data copy unit 12.

Figure 2:
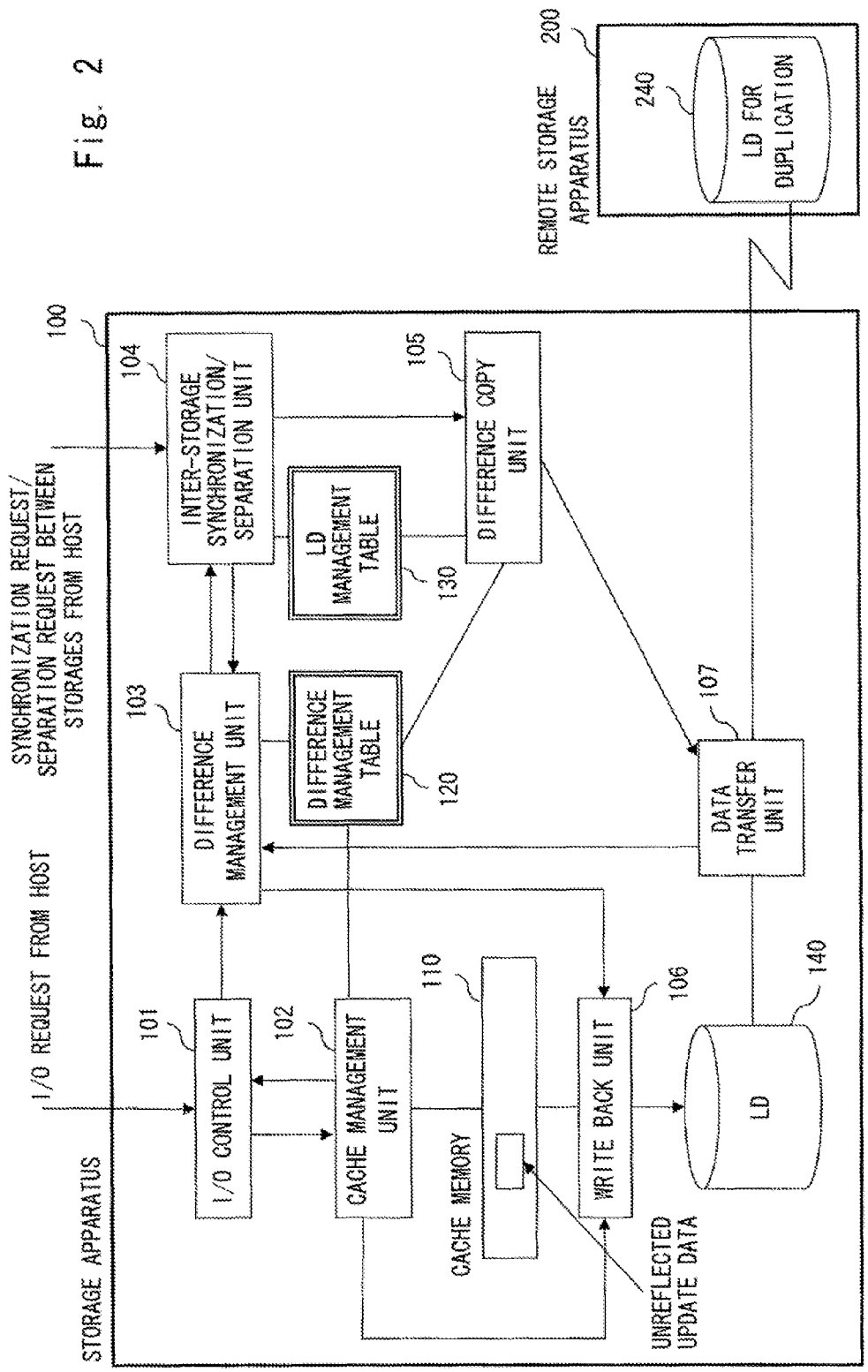
FIG. 2 is a block diagram showing the storage apparatus according to the exemplary embodiment of the present invention.

Next, referring to FIG. 2, a storage apparatus according to the exemplary embodiment of the present invention will be described. FIG. 2 is a block diagram showing a storage apparatus according to the exemplary embodiment of the present invention.

The storage apparatus 100 includes an I/O control unit 101, a cache management unit 102, a difference management unit 103, an inter-storage synchronization/separation unit 104, a difference copy unit 105, a write back unit 106, a data transfer unit 107, a cache memory 110, a difference management table 120, a logic disk (hereinafter referred to as "LD") management table 130, and an LD 140. Further, the storage apparatus 100 is connected to a remote storage apparatus 200 including an LD for duplication 240 by any communication means such as the Internet, an intranet, or a telephone network.

The I/O control unit 101 performs processing to acquire an I/O request output from the host. Now, the I/O request includes a write request or a read request of data to/from the LD 140. The I/O request output from the host includes information indicating a logic block address and an LD of a logic block which is the target of writing or reading. When the request from the host is the write request, the I/O control unit 101 outputs a write request occurrence notification including the information indicating the logic block address and the LD specified by the write request to the difference management unit 103. Further, the I/O control unit 101 supplies the I/O request that is acquired to the cache management unit 102.

The cache management unit 102 acquires the I/O request output from the I/O control unit 101, to perform processing according to the I/O request that is acquired. When acquiring the write request, the cache management unit 102 stores the data that is to be written into the LD 140 in the cache memory 110. Then, the cache management unit 102 judges, based on information stored in the difference management table 120, whether it is possible to write back data from the cache memory 110 to the logic block which is the target for writing in the LD 140. Upon judgment that write-back operation is possible, the cache management unit 102 outputs a write back request including information indicating the logic block address and the LD of the logic block which is the target for writing to the write back unit 106. Further, when acquiring the read request, the cache management unit 102 acquires the data stored in the logic block which is the target for reading of the LD 140, and outputs the acquired data to the I/O control unit 101.

The difference management unit 103 manages a difference of data between the LD 140 and the LD for duplication 240 (hereinafter referred to as "logic difference"). Further, the difference management unit 103 operates when acquiring a write request occurrence notification, a transfer completion notification, or a separation request reception notification.

Upon acquiring the write request occurrence notification output from the I/O control unit 101, the difference management unit 103 updates a logic difference flag corresponding to the logic block specified by the write request occurrence notification among logic difference flags that are stored in the difference management table 120 and indicate whether there is a logic difference to "having logic difference". Further, the difference management unit 103 judges whether the specified logic block is "separation copy uncompleted", which means whether the separation copy is being executed, based on a separation copy uncompleted flag that is stored in the difference management table 120 and indicates whether the separation copy is uncompleted. When the separation copy is uncompleted, the cache management unit 102 judges that the write-back operation cannot be performed. In this case, the cache management unit 102 stores the written data only in the cache memory 110, and not in the LD 140. Thus, the difference management unit 103 updates a disk unreflected flag corresponding to the specified logic block among disk unreflected flags that are stored in the difference management table 120 and indicate whether the data is unreflected to the LD 140 to "disk unreflected".

Further, when acquiring the transfer completion notification output from the data transfer unit 107, the difference management unit 103 refers to the difference management table 120, so as to judge whether the logic block in which data copy is completed is "separation copy uncompleted".

When it is judged that the separation copy is uncompleted, which means the separation copy is executed, the difference management unit 103 updates the separation copy uncompleted flag corresponding to the logic block to "separation copy completed". In summary, when the copy by the separation is completed, this processing is performed. Further, in this case, when the logic block is "disk unreflected", the difference management unit 103 supplies the write back request of the data to the logic block to the write back unit 106. Then, the difference management unit 103 updates the disk unreflected flag corresponding to the logic block to "disk reflected". Further, the difference management unit 103 refers to the difference management table 120, to judge whether all the logic blocks included in the LD specified by the transfer completion notification is "separation copy completed". When all the logic blocks are "separation copy completed", a difference cancel notification including the information indicating the LD is output to the inter-storage synchronization/separation unit 104.

On the other hand, when it is judged that the logic block in which data copy is completed is "separation copy completed", which means the separation copy has not been performed, the difference management unit 103 updates the logic difference flag corresponding to the logic block to "no logic difference". In summary, this processing is performed when the copy by synchronization is performed, not the copy by separation. Then, the difference management unit 103 judges whether all the logic blocks included in the LD specified by the transfer completion notification are "no logic difference". When all the data are "no logic difference", the difference cancel notification including the information indicating the LD is output to the inter-storage synchronization/separation unit 104.

Further, when acquiring the separation request reception notification output from the inter-storage synchronization/separation unit 104, the difference management unit 103 updates, in the LD specified by the separation request reception notification, the separation copy uncompleted flag corresponding to the logic block indicating the logic difference flag of "having logic difference", the separation copy uncompleted flag being stored in the difference management table 120, to "separation copy uncompleted". Then, since there is no logic difference after completion of the separation copy, the difference management unit 103 updates the logic difference flag corresponding to the logic block to "no logic difference".

As described above, in the exemplary embodiment, the copy by synchronization can be performed in addition to the copy by separation. As described above, in the separation copy, to copy the data in the LD 140 at the time of the instruction onto the LD for duplication 240, when data writing is performed, the data is stored only in the cache memory 110 and not into the LD 140 in the case of "separation copy uncompleted". However, in the synchronization copy, when data is written from the time at which the copy is instructed to perform copy, the data is written into the LD 140, and the written data is copied from the LD 140 to the LD for duplication 240. Thus, the difference management unit 103 updates the logic difference flag to "no logic difference" after acquiring the transfer completion notification.

In short, the separation copy is the copy which does not allow data rewriting during the copy, and the synchronization copy is the copy which allows data rewriting during copying.

The inter-storage synchronization/separation unit 104 manages the operation state of the LD. The inter-storage synchronization/separation unit 104 operates when acquiring the synchronization request or the separation request of the data between the LD 140 and the LD for duplication 240 from the host. Note that the synchronization request or the separation request output from the host includes information indicating the LD which is the target for synchronization or separation.

When acquiring the synchronization request output from the host, the inter-storage synchronization/separation unit 104 updates the operation state of the LD which is the target for synchronization among the operation state of each LD stored in the LD management table 130 to "under synchronization". Then, the inter-storage synchronization/separation unit 104 outputs a difference transfer request to the difference copy unit 105, and copies the data of the logic block having the logic difference of the LD which is the target for synchronization onto the LD for duplication 240. When the synchronization copy is completed and the difference cancel notification output from the difference management unit 103 is acquired, the inter-storage synchronization/separation unit 104 updates the operation state of the LD in the LD management table 130 in which synchronization is completed to "synchronization completed".

When acquiring the separation request output from the host, the inter-storage synchronization/separation unit 104 updates the operation state of the LD which is the target for separation among the operation state of each LD stored in the LD management table 130 to "under separation". Then, the inter-storage synchronization/separation unit 104 supplies the separation request reception notification including the information indicating the LD which is the target for separation to the difference management unit 103, to set the separation copy uncompleted flag corresponding to the logic block having the logic difference in the difference management table 120 to "separation copy uncompleted", to update the logic difference flag to "no logic difference". Further, the inter-storage synchronization/separation unit 104 supplies the difference transfer request to the difference copy unit 105, to copy the data of the logic block which is "under separation copy uncompleted" of the LD which is the target for separation onto the LD for duplication 240. When the separation copy is completed and the inter-storage synchronization/separation unit 104 acquires the difference cancel notification output from the difference management unit 103, the inter-storage synchronization/separation unit 104 updates the operation state of the LD in which the separation of the LD management table 130 is completed to "separation completed".

The difference copy unit 105 operates regularly at predetermined time intervals, or when receiving the synchronization request or the separation request from the inter-storage synchronization/separation unit 104. The difference copy unit 105 refers to the LD management table 130 and the difference management table 120 in operation, and supplies to the data transfer unit 107 a data copy request to instruct the copy of the data of the logic block having the logic difference in the LD in which the LD operation state is "under synchronization" or "synchronization completed". Further, the difference copy unit 105 refers to the LD management table 130 and the difference management table 120, and supplies the data copy request to the data transfer unit 107 to instruct the copy of the data of the logic block of "separation copy uncompleted" in the LD in which the LD operation state is "under separation". Note that the data copy request includes information indicating the logic block address and the LD of the logic block whose data is to be copied.

The write back unit 106 performs processing to write back the data written in the cache memory 110 to the LD 140. The write back unit 106 acquires the write back request output from the cache management unit 102 or the difference management unit 103, and writes data of the cache memory 110 corresponding to the logic block specified by the write back request that is acquired into the LD 140. Then, the write back unit 106 outputs the write back completion notification to the output source of the write back request.

The data transfer unit 107 acquires the data copy request output from the difference copy unit 105, and copies the data stored in the logic block specified by the data copy request that is acquired onto the LD for duplication 240 included in the remote storage apparatus 200 from the LD 140. After completion of the copy, the data transfer unit 107 supplies the transfer completion notification including the information indicating the logic block address and the LD of the logic block in which the copy is completed to the difference management unit 103.

The cache memory 110 is a memory to buffer the data written into the LD 140 or read out from the LD 140 in order to increase the speed of data input/output between the host and the storage apparatus 100. In summary, the data which is read out from or written into the host can be buffered in the cache memory 20, and the data can be read out from the cache memory 20 next time the host reads out the data.

The difference management table 120 is a table that stores information regarding each logic block included in the LD 140. Referring to FIG. 3A, the difference management table will be described. FIG. 3A is a diagram showing an example of the difference management table according to the exemplary embodiment of the present invention.

"LD number" is a number that corresponds to each LD and that is uniquely determined.

"Addr" is information showing the address of the logic block included in each LD.

The "logic difference flag" is the information indicating whether there is a logic difference. The logic difference flag is updated to "having logic difference" ("1") when the storage apparatus 100 receives the write request of the data from the host, data is written into the LD 140, and the difference is occurred in the data between the LD 140 and the LD for duplication 240. Further, the logic difference flag is updated to "no logic difference" ("0") when the separation copy is started or the synchronization copy is completed.

The "separation copy uncompleted flag" is the information indicating whether the separation copy is uncompleted, or whether the separation copy is being executed. The separation copy uncompleted flag is updated to "separation copy uncompleted" ("1") when the separation copy is started. Further, the separation copy uncompleted flag is updated to "separation copy completed" ("0") when the separation copy is completed.

The "disk unreflected flag" is the information indicating whether the written data is unreflected from the cache memory 110 to the LD 140. The disk unreflected flag is updated to "disk unreflected" ("1") when the write request of the data is received during the separation copy, and the data is written only into the cache memory 110. Further, the disk unreflected flag is updated to "disk reflected" ("0") when the separation copy is completed and the data is written back from the cache memory 110 to the LD 140.

The LD management table 130 is a table that stores the operation state for each LD. Referring to FIG. 3B, the LD management table will be described. FIG. 3B is a diagram showing an example of the LD management table according to the exemplary embodiment of the present invention.

"LD number" is a number that corresponds to each LD, and that is uniquely determined.

"LD operation state" is the information indicating the operation state of each LD. The information indicating the operation state of any of "under synchronization", "synchronization completed", "under separation", and "separation completed" is stored.

Note that each of the difference management table 120 and the LD management table 130 is formed of any storing means such as a hard disk, a memory, or the like.

The LD 140 includes one or a plurality of logic disks, and stores data which is read out from or written into the host computer. The LD 140 is formed of one or a plurality of hard disks.

The LD for duplication 240 stores the copy of data stored in the LD 140. The LD for duplication 240 is formed of one or a plurality of hard disks.

The LD 140 and the LD for duplication 240 are not limited to the configurations exemplified in the exemplary embodiment. For example, they may be formed of other components than a hard disk (e.g., a storage device such as a flash memory).

Figure 4:
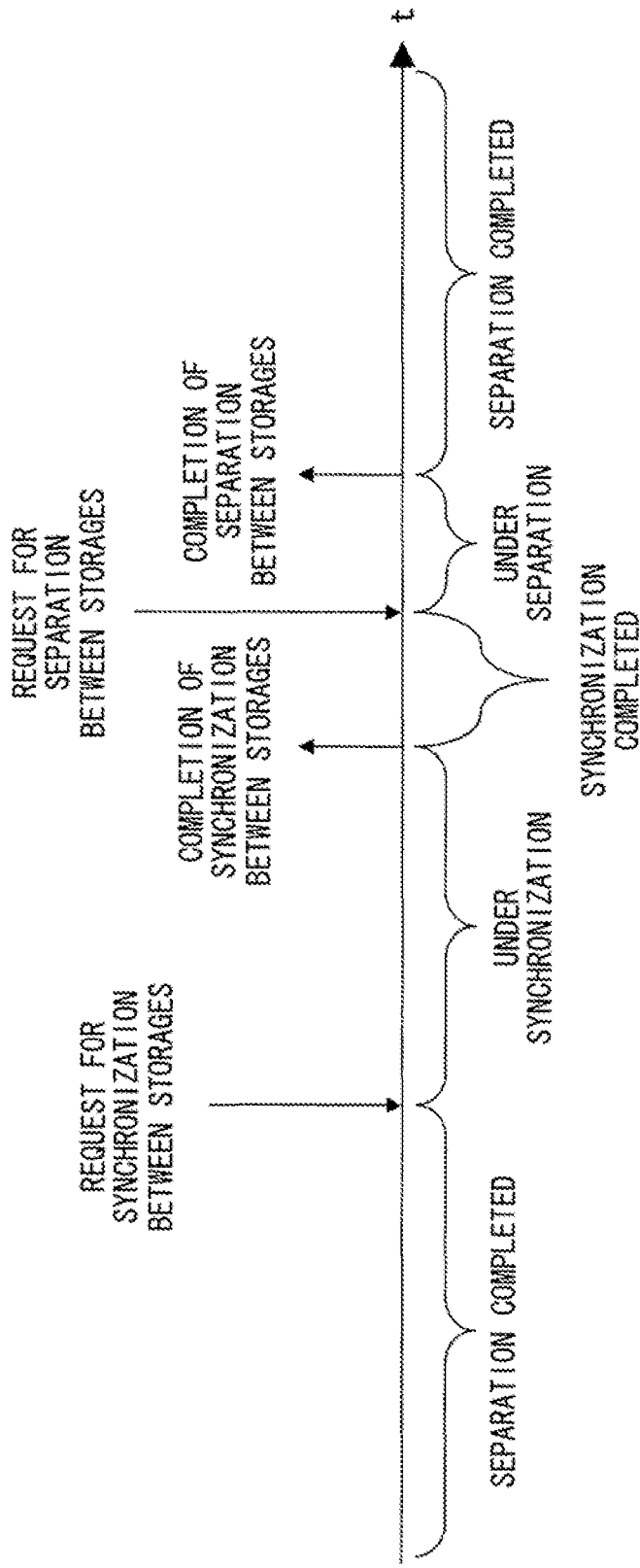
FIG. 4 is a diagram showing an example of a relation between an LD operation state and a synchronization/separation request according to the exemplary embodiment of the present invention.

Subsequently, referring to FIG. 4, a relation between the LD operation state and the synchronization/separation request will be described. FIG. 4 is a diagram showing one example of a relation between the LD operation state and the synchronization/separation request according to the exemplary embodiment of the present invention.

The LD operation state is updated to "under synchronization" when the storage apparatus 100 receives the synchronization request from the host under the state of "separation completed". Then, when the synchronization copy is completed in the state of "under synchronization", and there is no logic difference of data of all the logic blocks included in the LD, the flag is updated to "synchronization completed". Further, when the storage apparatus 100 receives the separation request from the host in the state of "synchronization completed", the flag is updated to "under separation". Then, when the separation copy is completed and the data of all the logic blocks included in the LD are "separation copy completed" in the state of "under separation", the flag is updated to "separation completed".

Figure 5:
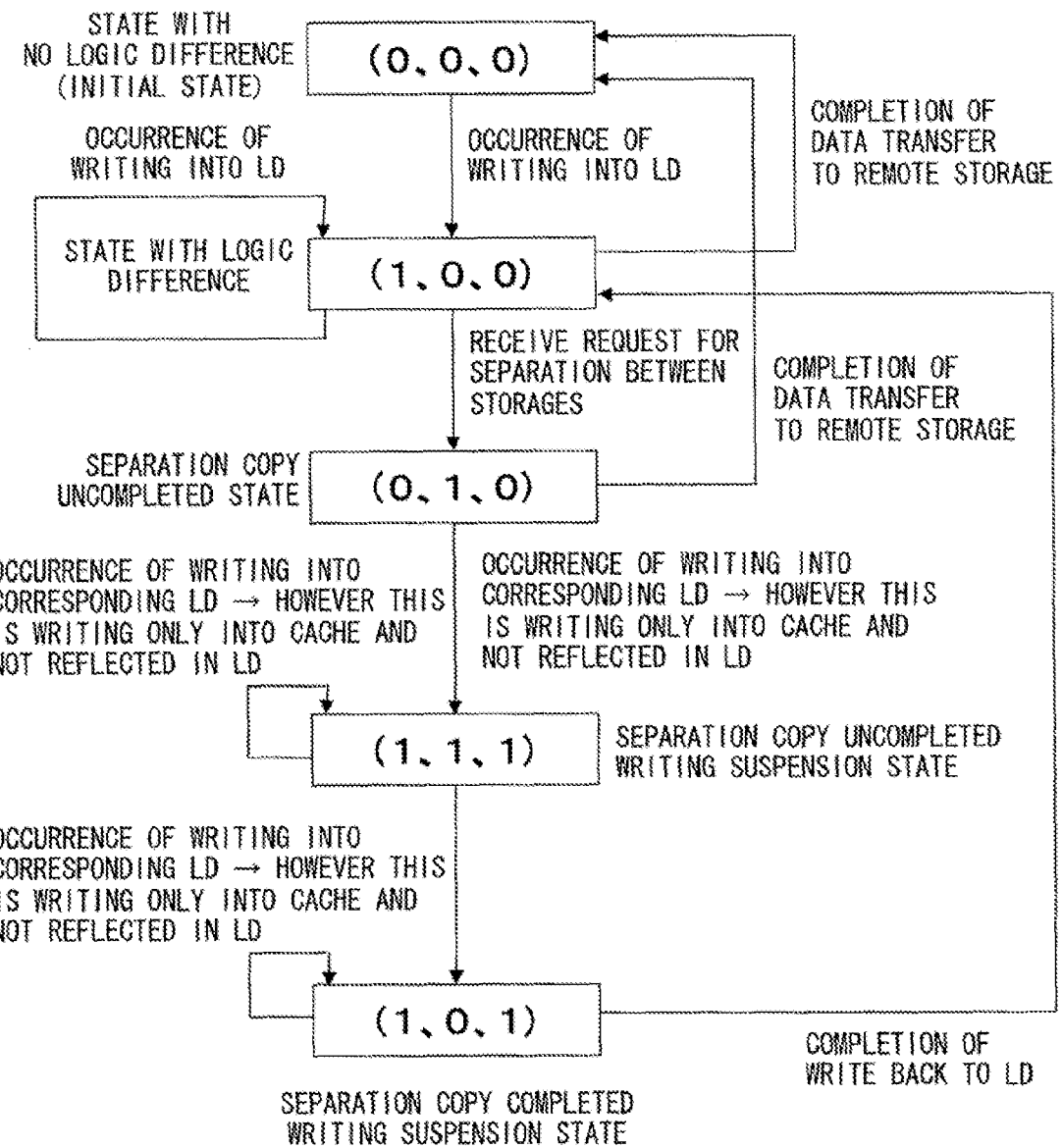
FIG. 5 is a state transition diagram showing each flag of the difference management table according to the exemplary embodiment of the present invention.

Subsequently, referring to FIG. 5, a state transition of each flag of the difference management table will be described. FIG. 5 is a state transition diagram of each flag of the difference management table according to the exemplary embodiment of the present invention. Note that, in FIG. 5, each flag is represented by (x, y, z), where the logic difference flag is denoted by x, the separation copy uncompleted flag by y, and the disk unreflected flag by z.

First, the initial state of each flag corresponding to each of logic blocks is (0, 0, 0). Since there is no logic difference, this state is called "state with no logic difference".

When receiving the write request occurrence notification from the I/O control unit 101 in the state with no logic difference, the difference management unit 103 updates the flag to (1, 0, 0). Since transition is made to the state with logic difference, this state is called "state with logic difference". When further receiving the write request occurrence notification under this state, the difference management unit 103 does not update the flag. Further, when receiving the transfer completion notification from the data transfer unit 107 in this state, the synchronization copy is completed and there is no logic difference any more. Thus, the difference management unit 103 updates the flag to (0, 0, 0).

When receiving the separation request reception notification from the inter-storage synchronization/separation unit 104 under the state with logic difference, the difference management unit 103 updates the flag to (0, 1, 0). This state is called "separation copy uncompleted state". Further, when the difference management unit 103 receives the transfer completion notification from the data transfer unit 107 in this state, the separation copy is completed. Thus, the difference management unit 103 updates the flag to (0, 0, 0).

When receiving the write request occurrence notification from the I/O control unit 101 under the separation copy uncompleted state, the cache management unit 102 writes data into the cache memory 110, but the write back operation is not requested to the write back unit 106. Thus, the difference management unit 103 updates the flag to (1, 1, 1). This state is called "separation copy uncompleted writing suspension state". Further, also when receiving the write request occurrence notification from the I/O control unit 101 under this state, the cache management unit 102 writes data into the cache memory 110, but the write back operation is not requested to the write back unit 106. Thus, the difference management unit 103 does not update the flag.

When receiving the transfer completion notification from the data transfer unit 107 under the state of "separation copy uncompleted writing suspension state", the separation copy is completed. Thus, the difference management unit 103 updates the flag to (1, 0, 1). This state is called "separation copy completed writing suspension state". Further, when receiving the write request occurrence notification from the I/O control unit 101 in this state, the cache management unit 102 writes data into the cache memory 110, but the write back operation is not requested to the write back unit 106. Thus, the difference management unit 103 does not update the flag.

When receiving the write back completion notification from the write back unit 106 under the state of "separation copy completed writing suspension state", the data at the time of the separation request is copied onto the LD for duplication 240, whereas the data of the write request received after the separation request is stored in the LD 140. In this state, there is a logic difference. Thus, the difference management unit 103 updates the flag to (1, 0, 0), which indicates the state with logic difference.

Subsequently, referring to FIGS. 6 to 14, processing of the storage apparatus according to the exemplary embodiment of the present invention will be described.

Figure 6:
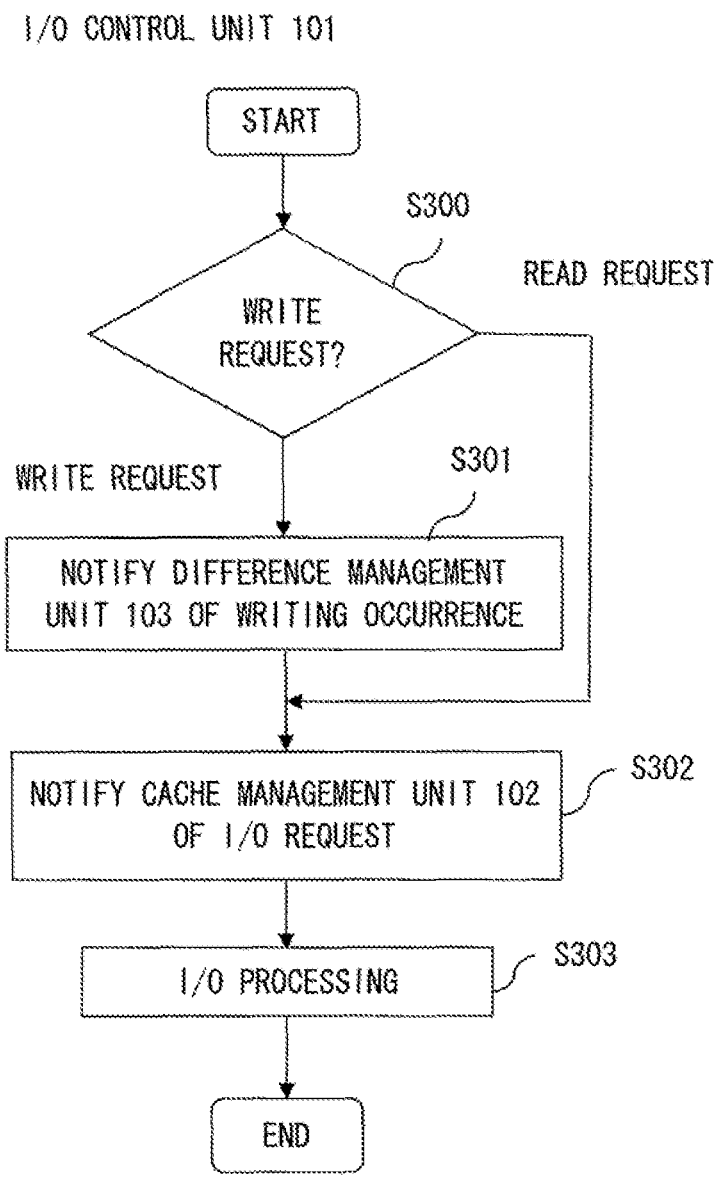
FIG. 6 is a flow chart showing processing of an I/O control unit according to the exemplary embodiment of the present invention.

Referring first to FIG. 6, processing of the I/O control unit according to the exemplary embodiment of the present invention will be described. FIG. 6 is a flow chart showing processing of the I/O control unit according to the exemplary embodiment of the present invention.

First, upon acquiring the I/O request output from the host, the I/O control unit 101 judges whether the I/O request is the write request or the read request (S300).

When the I/O request is the read request, the I/O control unit 101 supplies the I/O request, which is the read request, to the cache management unit 102 (S302).

When the I/O request is the write request, the I/O control unit 101 supplies the write request occurrence notification to the difference management unit 103 (S301). Then, the I/O control unit 101 supplies the I/O request, which is the write request, to the cache management unit 102 (S302).

Then, the I/O control unit 101 acquires the I/O processing result output from the cache management unit 102, and outputs the I/O processing result that is acquired to the host (S303).

Figure 7:
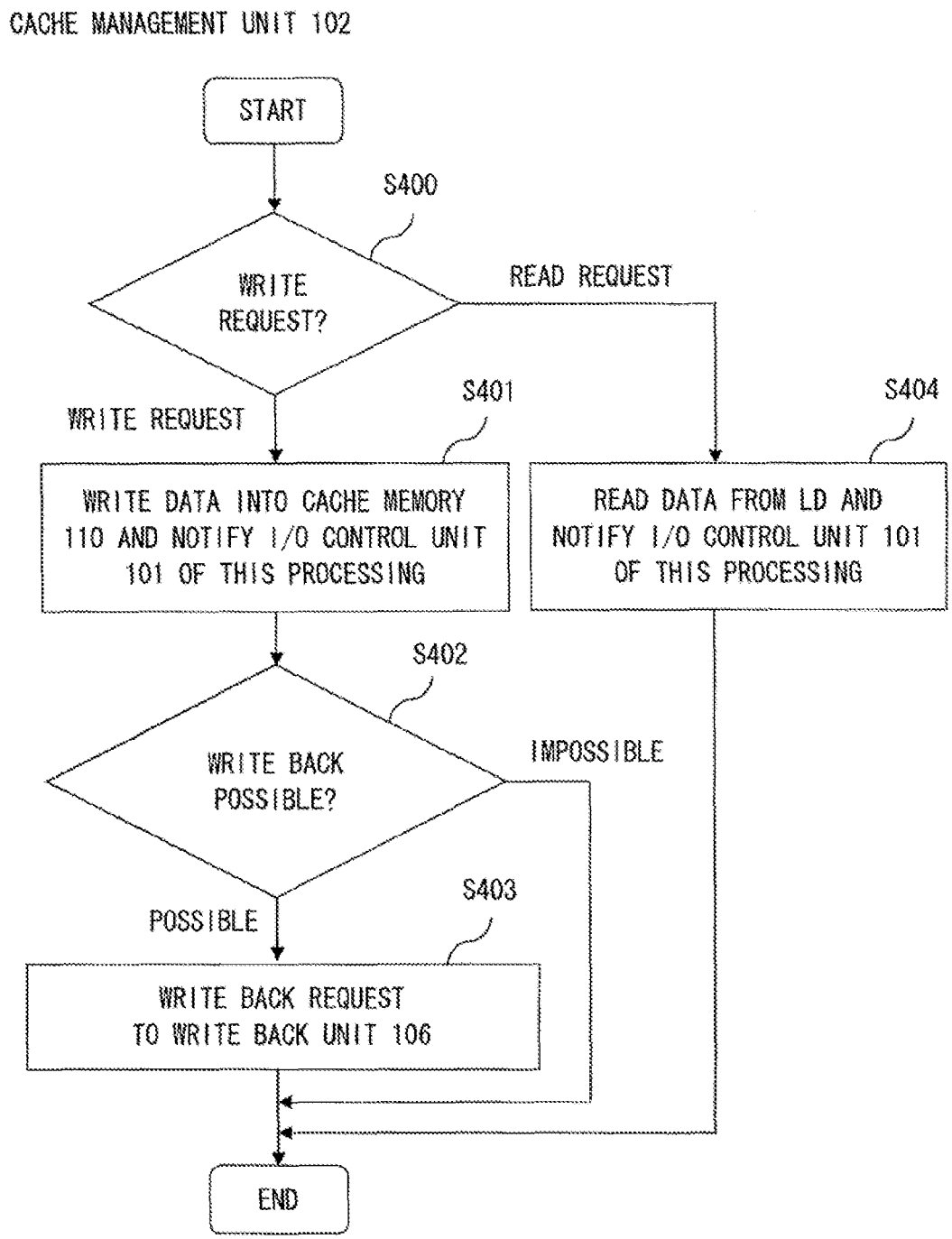
FIG. 7 is a flow chart showing processing of a cache management unit according to the exemplary embodiment of the present invention.

Subsequently, referring to FIG. 7, processing of the cache management unit according to the exemplary embodiment of the present invention will be described. FIG. 7 is a flow chart showing the processing of the cache management unit according to the exemplary embodiment of the present invention.

Upon acquiring the I/O request output from the I/O control unit 101, the cache management unit 102 judges whether the I/O request that is acquired is the write request or the read request (S400).

When the I/O request is the read request, the cache management unit 102 reads out the data of the logic block specified by the I/O request, and supplies the I/O processing result including the data that is read out to the I/O control unit 101 (S404).

When the I/Q request is the write request, the cache management unit 102 writes data in the area of the cache memory 110 corresponding to the logic block specified by the I/O request, and supplies the I/O processing result indicating completion of data writing to the I/O control unit 101 (S401). Then, the cache management unit 102 refers to the flag corresponding to the logic block specified in the difference management table 120, so as to judge whether the write back operation is possible (S402). When the separation copy uncompleted flag is "separation copy uncompleted" ("1") or the disk unreflected flag is "disk unreflected" ("1"), it is judged that the write back operation is impossible.

When it is judged that the write back operation is impossible, the cache management unit 102 ends the processing without requesting the write back operation to the write back unit 106.

When it is judged that the write back operation is possible, the cache management unit 102 supplies the write back request including the information indicating the logic block address and the LD of the logic block that is specified to the write back unit 106 (S403).

Figure 8:
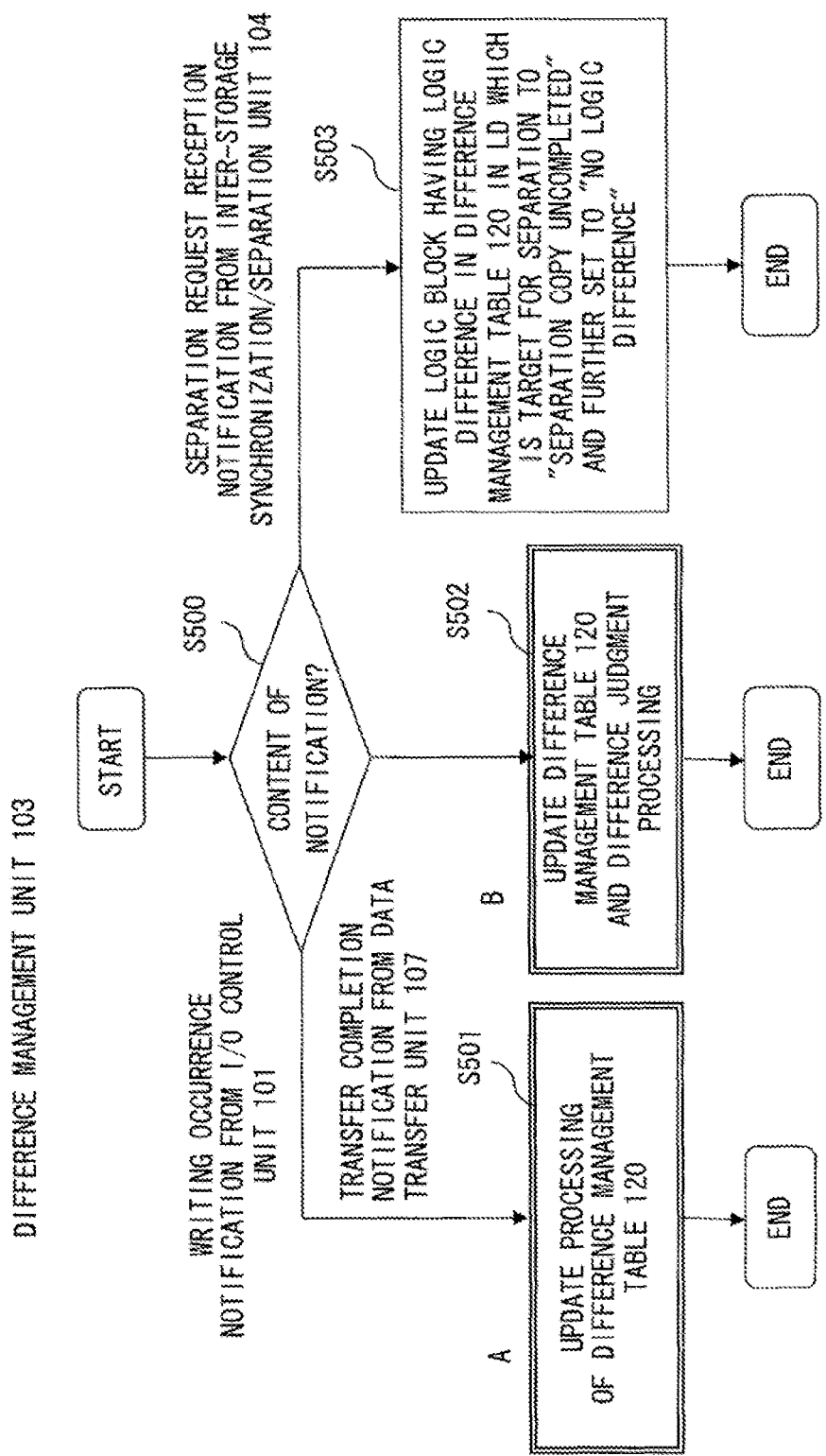
FIG. 8 is a flow chart showing processing of a difference management unit according to the exemplary embodiment of the present invention.
Figure 9:
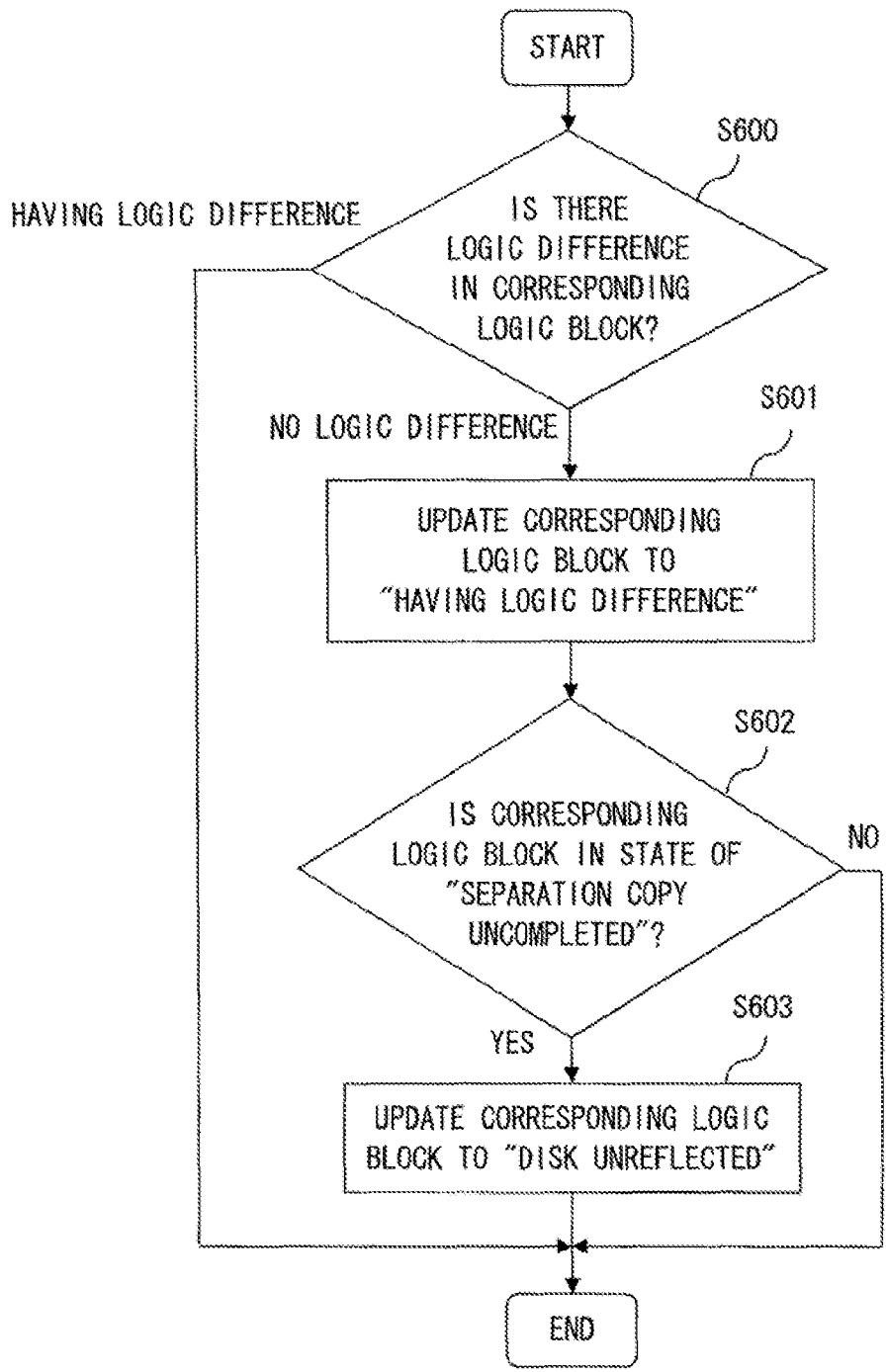
FIG. 9 is a flow chart showing update processing of the difference management table according to the exemplary embodiment of the present invention.
Figure 10:
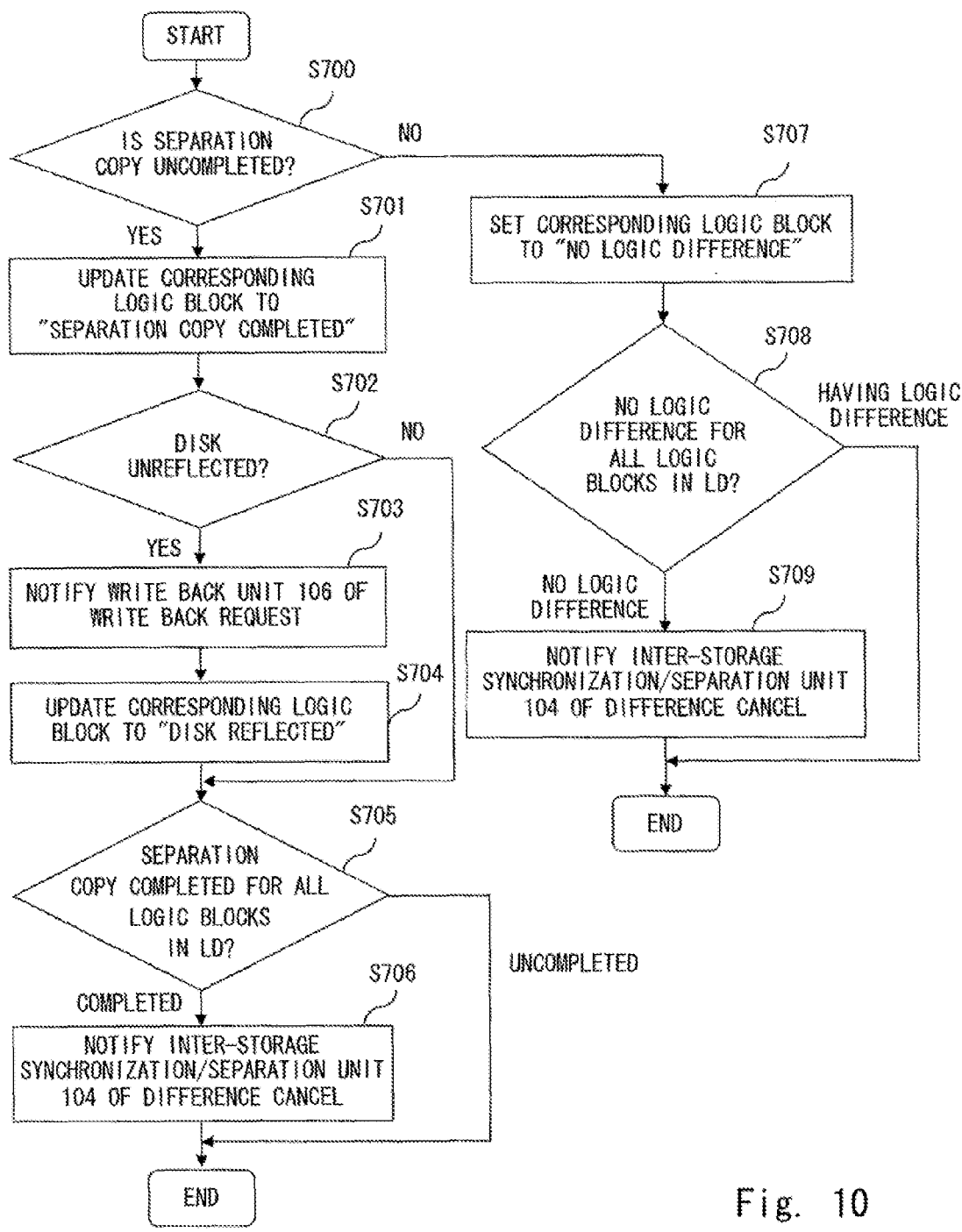
FIG. 10 is a flow chart showing update of the difference management table and difference judgment processing according to the exemplary embodiment of the present invention.

Next, referring to FIGS. 8 to 10, processing of the difference management unit according to the exemplary embodiment of the present invention will be described. FIGS. 8 to 10 are flow charts showing processing of the difference management unit according to the exemplary embodiment of the present invention.

First, the difference management unit 103 judges the content of the notification that is acquired (S500).

When the content of the notification that is acquired indicates the writing occurrence notification from the I/O control unit 101, the difference management unit 103 performs update processing of the difference management table 120 (S501). The update processing of the difference management table 120 will be described later in detail.

When the content of the notification that is acquired indicates the transfer completion notification from the data transfer unit 1074, the difference management unit 103 performs update of the difference management table 120 and difference judgment processing (S502). The update of the difference management table 120 and the difference judgment processing will be described in detail.

When the content of the notification that is acquired indicates the separation request reception notification from the inter-storage synchronization/separation unit 104, the difference management unit 103 updates, in the LD specified in the separation request reception notification, the separation copy uncompleted flag corresponding to the logic block in which the logic difference flag indicates "having logic difference" ("1") to "separation copy uncompleted" ("1"), and updates the logic difference flag to "no logic difference" ("0") (S503). Then, upon completion of the update of the flag of the difference management table 120, the difference management unit 103 supplies the separation request reception notification response to notify the update completion to the inter-storage synchronization/separation unit 104.

Next, the update processing of the difference management table 120 by the difference management unit 103 will be described. FIG. 9 is a flow chart showing the update processing of the difference management table 120 by the difference management unit 103.

First, the difference management unit 103 refers to the difference management table 120, to judge whether there is a logic difference in the logic block specified by the write request occurrence notification (S600).

When there is a logic difference, the difference management unit 103 ends the processing.

When there is no logic difference, the difference management unit 103 updates the logic difference flag corresponding to the logic block that is specified to "having logic difference" ("1") (S601). Then, the difference management unit 103 judges whether the separation copy of the logic block is uncompleted (S602).

When the separation copy is uncompleted, or when the data of the logic block is under separation copy, the difference management unit 103 updates the disk unreflected flag corresponding to the logic block to "disk unreflected" (S603).

When the separation copy is completed, which means when the data of the logic block is not under the separation copy, the difference management unit 103 ends the processing.

Next, the update of the difference management table 120 and difference judgment processing by the difference management unit 103 will be described. FIG. 10 is a flow chart of the update of the difference management table 120 and difference judgment processing by the difference management unit 103.

First, the difference management unit 103 refers to the difference management table 120, to judge whether the logic block specified by the transfer completion notification is "separation copy uncompleted" (S700).

When it is judged that the separation copy is uncompleted, which means the transfer completion notification by the separation copy, the difference management unit 103 updates the separation copy uncompleted flag corresponding to the logic block that is specified to "separation copy completed" ("0") (S701). Then, the difference management unit 103 judges whether the logic block is "disk unreflected" (S702).

In the case of "disk unreflected", the difference management unit 103 supplies the write back request including the information indicating the logic block address and the LD of the logic block to the write back unit 106, and waits for completion of the write back operation (S703). Then, when receiving the write back completion notification from the write back unit 106, the difference management unit 103 updates the disk unreflected flag of this logic block to "disk reflected" ("0"). The difference management unit 103 then performs the processing of step S705.

In the case of "disk reflected", the difference management unit 103 performs the processing of step S705.

In step S705, the difference management unit 103 refers to the difference management table 120, to judge whether all the logic blocks in the LD specified by the transfer completion notification are "separation copy completed" (S705).

When all the logic blocks are "separation copy completed", the difference management unit 103 supplies the difference cancel notification including the information indicating the LD to the inter-storage synchronization/separation unit 104 (S706).

When not all the logic blocks are "separation copy completed", the difference management unit 103 ends the processing.

On the other hand, when it is judged in step S700 that the separation copy is completed, which means the transfer completion notification by the synchronization copy, the logic difference flag corresponding to the logic block that is specified is updated to "no logic difference" ("0"). Then, the difference management unit 103 refers to the difference management table 120, to judge whether all the logic blocks in the LD specified by the transfer completion notification are "no logic difference" (S708).

When all the logic blocks have no logic difference, the difference management unit 103 supplies the difference cancel notification including the information indicating this LD to the inter-storage synchronization/separation unit 104 (S706).

When not all the logic blocks are "no logic difference", the difference management unit 103 ends the processing.

Figure 11:
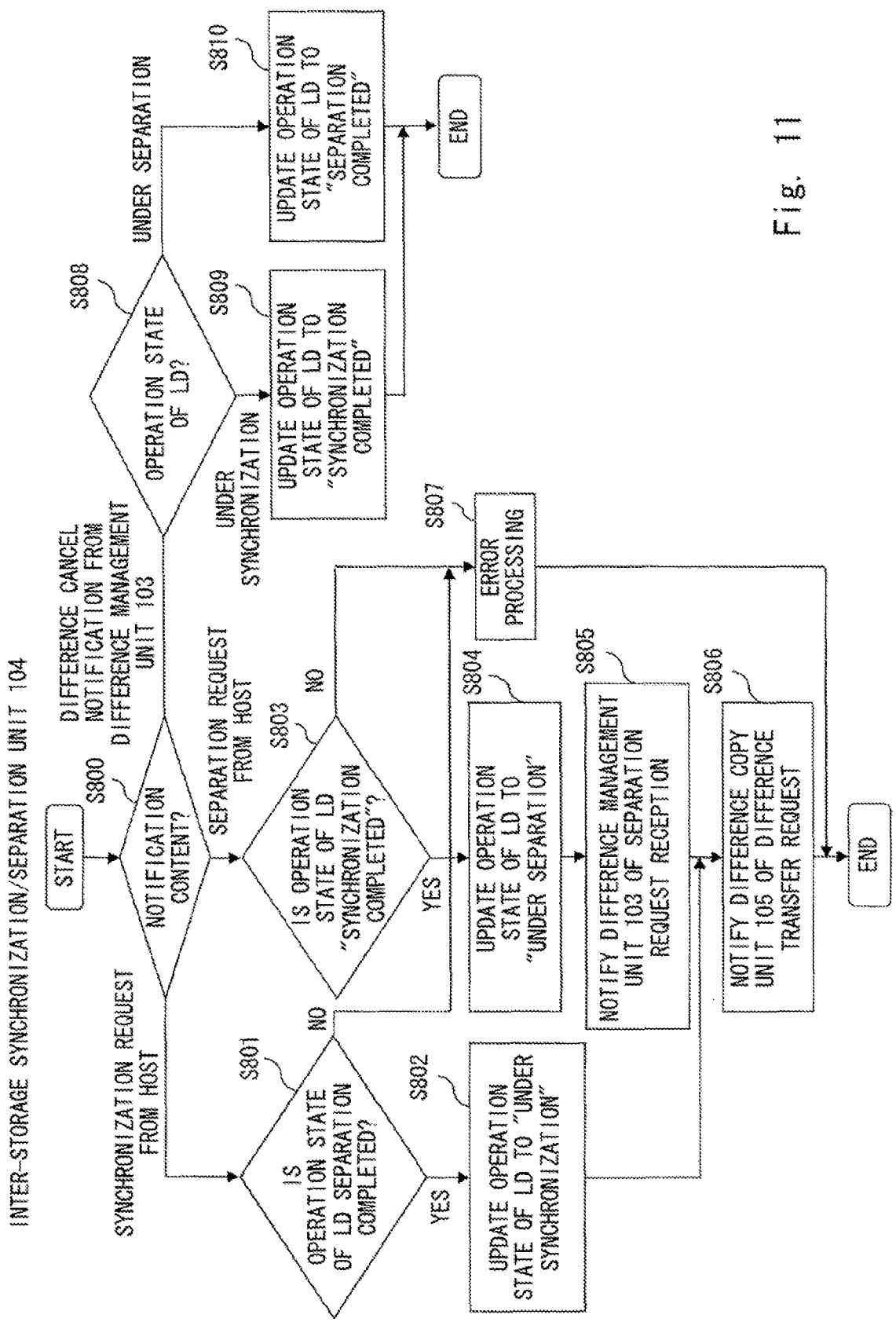
FIG. 11 is a flow chart showing processing of an inter-storage synchronization/separation unit according to the exemplary embodiment of the present invention.

Subsequently, referring to FIG. 11, processing of the inter-storage synchronization/separation unit according to the exemplary embodiment of the present invention will be described. FIG. 11 is a flow chart showing processing of the inter-storage synchronization/separation unit according to the exemplary embodiment of the present invention.

First, the inter-storage synchronization/separation unit 104 judges the content of the notification that is acquired (S800).

When the content of the notification that is acquired indicates the synchronization request from the host, the inter-storage synchronization/separation unit 104 refers to the LD management table 130, to judge whether the operation state of the LD specified by the synchronization request is "separation completed" (S801).

When the operation state of the LD is "separation completed", the inter-storage synchronization/separation unit 104 updates the operation state of the LD to "under synchronization" (S802). Then, the inter-storage synchronization/separation unit 104 supplies the difference transfer request to the difference copy unit 105 (S806).

When the operation state of the LD is other than "separation completed", the inter-storage synchronization/separation unit 104 outputs the notification indicating that the synchronization request is rejected as an error to the host (S807).

Meanwhile, when the content of the notification that is acquired indicates the separation request from the host, the inter-storage synchronization/separation unit 104 refers to the LD management table 130, to judge whether the operation state of the LD specified by the separation request is "synchronization completed" (S803).

When the operation state of the LD is "synchronization completed", the inter-storage synchronization/separation unit 104 updates the operation state of the LD to "under separation" (S804). Then, the inter-storage synchronization/separation unit 104 supplies the separation request reception notification to the difference management unit 103 (S805). The inter-storage synchronization/separation unit 104 waits for the separation request reception notification response output after the difference management unit 103 updates the flag of the difference management table 120 according to the separation request reception notification. When receiving the separation request reception notification response that is waited from the difference management unit 103, the inter-storage synchronization/separation unit 104 supplies the difference transfer request to the difference copy unit 105 (S806).

When the operation state of the LD is other than "synchronization completed", the inter-storage synchronization/separation unit 104 supplies the notification that the separation request is rejected as an error to the host (S807).

On the other hand, when the content of the notification that is acquired indicates the difference cancel notification from the difference management unit 103, the inter-storage synchronization/separation unit 104 refers to the LD management table 130, to judge whether the operation state of the LD specified by the difference cancel notification is "under synchronization" or "under separation" (S808).

When the operation state of the LD is "under synchronization", the inter-storage synchronization/separation unit 104 updates the operation state of the LD that is specified to "synchronization completed" (S809).

When the operation state of the LD is "under separation", the inter-storage synchronization/separation unit 104 updates the operation state of the LD that is specified to "separation completed" (S810).

Figure 12:
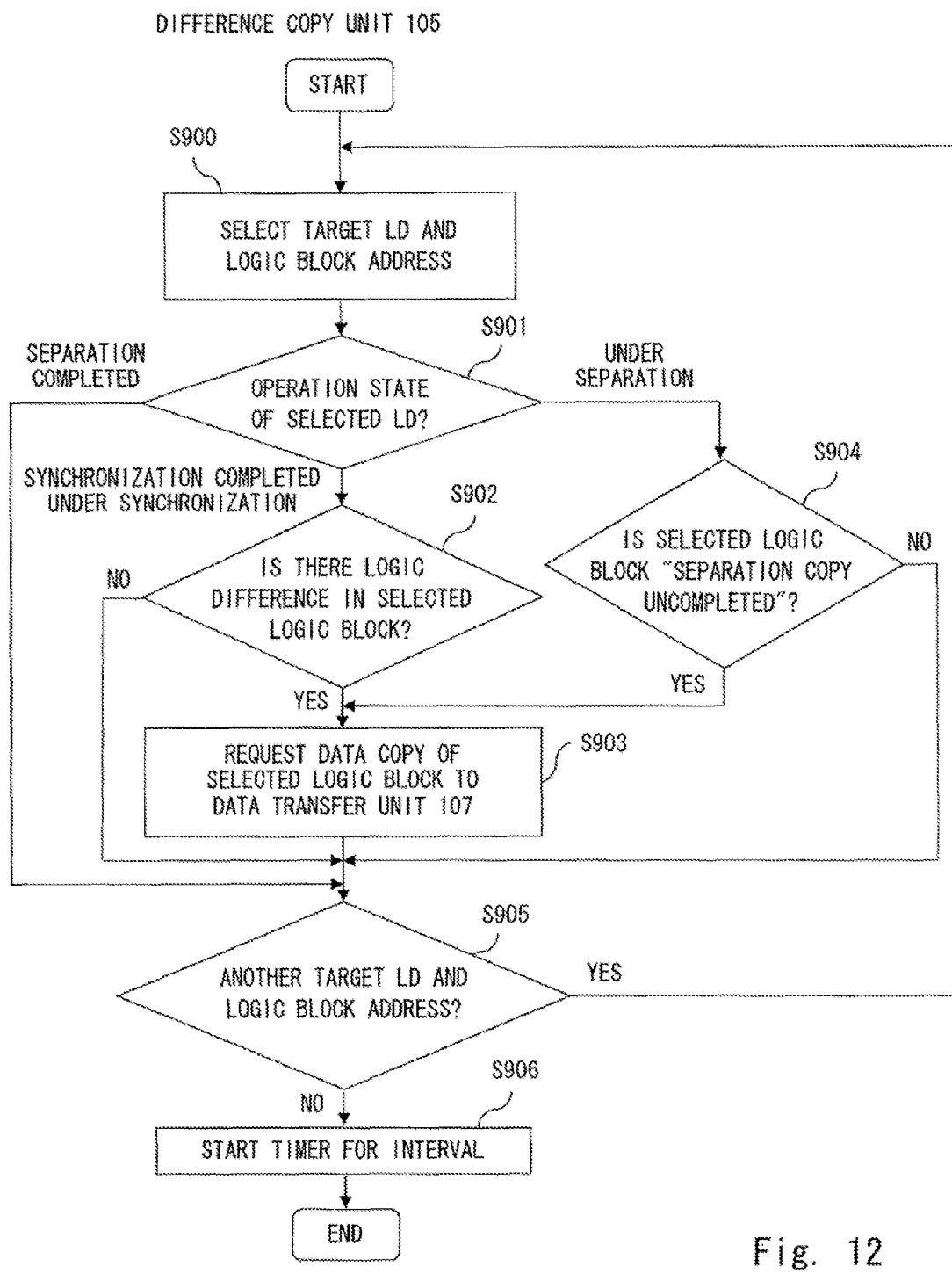
FIG. 12 is a flow chart showing processing of a difference copy unit according to the exemplary embodiment of the present invention.

Next, referring to FIG. 12, processing of the difference copy unit according to the exemplary embodiment of the present invention will be described. FIG. 12 is a flow chart showing processing of the difference copy unit according to the exemplary embodiment of the present invention.

First, when receiving the difference transfer request from the inter-storage synchronization/separation unit 104, the difference copy unit 105 selects the logic block address and the LD that is the target for processing (S900). In short, the logic block which is the target for processing is selected. Now, the difference copy unit 105 performs processing until when all the combinations of the LDs and the logic block addresses are selected. Note that the order of the selection of the combination may be determined arbitrarily. For example, the selection may be performed from the top of the difference management table 120 in series.

Then the difference copy unit 105 refers to the LD management table 130, to check the operation state of the LD that is selected (S901).

When the operation state of the LID that is selected is "separation completed", the difference copy unit 105 performs the processing of step S905.

When the operation state of the LD that is selected is "under synchronization" or "synchronization completed", the difference copy unit 105 refers to the difference management table 120, to judge whether there is a logic difference in the logic block that is selected (S902).

When there is no logic difference, the difference copy unit 105 performs the processing of step S905.

When there is a logic difference, the difference copy unit 105 supplies the data copy request including the information indicating the logic block address and the LD of the logic block that is selected to the data transfer unit 107, in order to request copy of the data in the logic block that is selected onto the LD for duplication 240 (S903). The difference copy unit 105 then performs processing of step S905.

When the operation state of the LD that is selected is "under separation", the difference copy unit 105 refers to the difference management table 120, to judge whether the logic block that is selected is "separation copy uncompleted" (S904).

When the flag is not "separation copy uncompleted", the difference copy unit 105 performs the processing of step S905.

When the flag is "separation copy uncompleted", the difference copy unit 105 supplies the data copy request including the information indicating the logic block address and the LD of the logic block that is selected to the data transfer unit 107 in order to request copy of the data in the logic block that is selected onto the LD for duplication 240 (S903). The difference copy unit 105 then performs the processing of step S905.

In step S905, the difference copy unit 105 judges whether there are an LD and a logic block address to be selected next (S905).

When there are an LD and a logic block address to be selected next, the difference copy unit 105 selects the next LD and the logic block address as the target for processing (S900), to perform the processing described above.

When there are no LD and logic block address to be selected next, the difference copy unit 105 starts a timer for an interval (S906), and operates again after a predetermined period of time.

Figure 13:
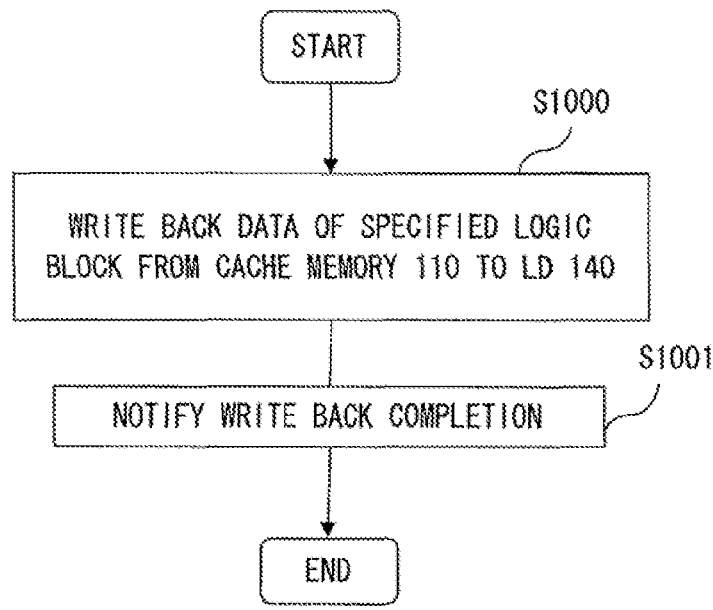
FIG. 13 is a flow chart showing processing of a write back unit according to the exemplary embodiment of the present invention.

Next, referring to FIG. 13, processing of the write back unit according to the exemplary embodiment of the present invention will be described. FIG. 13 is a flow chart showing the processing of the write back unit according to the exemplary embodiment of the present invention.

First, the write back unit 106 writes back the data of the logic block specified by the write back request from the cache memory 110 to the LD 140 according to the write back request received from the cache management unit 102 or the difference management unit 103.

Then, after completion of the write back operation, the write back unit 106 supplies the write back completion notification including the information indicating the logic block address and the LD of the logic block which is written back to the output source of the write back request (S1001).

Figure 14:
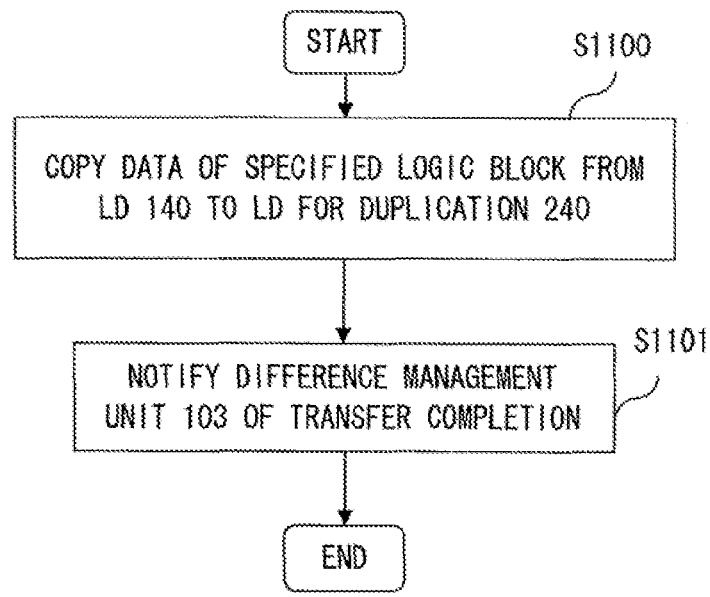
FIG. 14 is a flow chart showing processing of a data transfer unit according to the exemplary embodiment of the present invention.

Subsequently, referring to FIG. 14, the processing of the data transfer unit according to the exemplary embodiment of the present invention will be described. FIG. 14 is a flow chart showing the processing of the data transfer unit according to the exemplary embodiment of the present invention.

First, the data transfer unit 107 copies data of the logic block specified by the data copy request onto the LD for duplication 240 included in the remote storage apparatus 200 according to the data copy request output from the difference copy unit 105 (S1100).

Then, upon completion of the copy, the data transfer unit 107 supplies the transfer completion notification including the information indicating the logic block address and the LD of the logic block address that is copied to the difference management unit 103 (S1101).

Note that the present invention is not limited to the exemplary embodiment described above, but may be changed as appropriate without departing from the spirit of the present invention. For example, although shown in the exemplary embodiment is the configuration in which the LD for duplication 240 is included in the remote storage apparatus 200, the LD for duplication 240 may be included in the storage apparatus 100.

Further, although the written data is stored in the cache memory 110 also when the separation copy is not being executed according to the exemplary embodiment, the data may be directly written into the LD 140 in this case.

Further, although the error is detected when the separation request of the LD in which the LD operation state is "separation completed" is performed according to the exemplary embodiment, the separation request may be received even in this case.

As described above, according to the exemplary embodiment of the present invention, when the host writes data into the storage device, if separation copy which does not allow data rewriting during copying from the storage device to the storage device for duplication is being executed, data to be written into the storage device is stored in the cache memory, and after completion of the separation copy, the data stored in the cache memory is written into the storage device. Accordingly, it is possible to prevent such a situation that processing of data writing to the storage device of the host is suspended until the completion of the copy by separation, thereby being capable of performing a backing-up operation under the condition that a host computer is in operation.

Further, according to this technique, it is possible to copy data onto the storage device for duplication directly from the storage device also during the backing-up operation of the data, and no other additional resources than the storage device and the cache memory are necessary. For example, a resource to store the data to be copied is unnecessary.

Further, according to the exemplary embodiment of the present invention, since the data of the logic block including a logic difference is copied from the storage device to the storage device for duplication, even when data is written into the same logic block for a plurality of number of times, only the data that is written last can be copied onto the storage device for duplication, thereby making it possible to reduce the transfer amount of the data.

The storage apparatus according to the present invention described above can be configured by supplying a storage medium that stores a program achieving the functions of the above-stated exemplary embodiment to a system or a device, and executing this program by a computer or a CPU (Central Processing Unit), an MPU (Micro Processing Unit) included in the system or the device.

This program can be stored in various types of storage media, and can be transmitted by a communication medium. The storage medium includes, for example, a flexible disk, a hard disk, a magnetic disk, a magneto-optical disk, CD-ROM (Compact Disc Read Only Memory), DVD (Digital Versatile Disc), BD (Blu-ray Disc), a ROM (Read Only Memory) cartridge, a RAM (Random Access Memory) memory cartridge with battery backing-up operation, a flash memory cartridge, and a non-volatile RAM cartridge. Further, the communication medium includes a wired communication medium of a telephone line or a wireless communication medium of a microwave line, and includes the Internet.

Further, in addition to a case in which the functions of the exemplary embodiment described above are achieved by a computer executing the program that achieves the functions of the exemplary embodiment described above, a case in which the functions of the exemplary embodiment described above are achieved by a collaboration with an OS (Operating System) or an application soft operating on the computer based on the instruction of the program is also included in the exemplary embodiment of the present invention.

Further, also included in the exemplary embodiment of the present invention is a case in which all or a part of the processing of this program is performed by a function expansion board inserted into a computer or a function expansion unit connected to the computer to achieve the functions of the exemplary embodiment described above.

REFERENCE SIGNS LIST 1, 100 STORAGE APPARATUS
11 CONTROLLER
12 DATA COPY UNIT 20, 110 CACHE MEMORY
30 STORAGE DEVICE
40 STORAGE DEVICE FOR DUPLICATION
101 I/O CONTROL UNIT
102 CACHE MANAGEMENT UNIT
103 DIFFERENCE MANAGEMENT UNIT
104 INTER-STORAGE SYNCHRONIZATION/SEPARATION UNIT
105 DIFFERENCE COPY UNIT
106 WRITE BACK UNIT
107 DATA TRANSFER UNIT
120 DIFFERENCE MANAGEMENT TABLE
130 LD MANAGEMENT TABLE
140 LD
200 REMOTE STORAGE APPARATUS
240 LD FOR DUPLICATION

The invention claimed is:

1. A storage apparatus comprising:
a cache memory;
a storage device that stores data;
a data copy unit that copies data stored in the storage device onto a duplicate storage device;
a management information storage unit that stores differential information, the differential information indicating whether there is a difference between the data stored in the storage device and data stored in the duplicate storage device;
a controller that writes data into the storage device according to a request for writing the data into the storage device; and
a difference management unit that, when data is written into the storage device, stores the differential information in the management information storage unit; wherein:
when a separation copy, which does not allow data rewriting during copying, is requested, the data copy unit executes the separation copy if the differential information stored in the management information storage unit indicates a difference between the data stored in the storage device and the data stored in the duplicate storage device,
when writing data into the storage device, the controller stores the data to be written into the storage device in the cache memory if the data copy unit is executing a separation copy, and
if the data copy unit is executing a separation copy, after completing the separation copy, the controller writes the data stored in the cache memory in the storage device.

2. The storage apparatus according to claim 1, comprising writing data into the storage device without waiting for completion of copy when the data copy unit is executing the copy to allow data rewriting during copying.

3. The storage apparatus according to claim 2, wherein the controller stores data to be written into the storage device in the cache memory and writes the data stored in the cache memory in the storage device when data is written into the storage device.

4. The storage apparatus according to claim 1, wherein the management information storage unit further stores separation copy information indicating whether the separation copy is being executed, and
the controller judges whether the separation copy is being executed based on the separation copy information.

5. The storage apparatus according to claim 1, wherein the data corresponds to each of logic blocks in the storage device.

6. The storage apparatus according to claim 5, wherein the controller judges, in each of the logic blocks, whether the separation copy is being executed.

7. The storage apparatus according to claim 1, wherein the storage device is a hard disk.

8. A storage management method comprising:
writing data into a storage device according to a request for writing the data into the storage device;
storing a differential information, indicating whether there is a difference between the data written into the storage device and data stored in a duplicate storage device, in a management information storage unit;
executing a separation copy when the separation copy, which does not allow data rewriting during copying, is requested on the condition that the differential information, stored in the management information storage unit, indicates a difference between the data written into the storage device and the data stored in the duplicate storage device;
judging whether the separation copy is being executed when writing data into the storage device;
storing data to be written into the storage device in a cache memory when the separation copy is being executed; and
writing data stored in the cache memory in the storage device after completion of the separation copy.

9. A storage medium storing a storage management program that causes a computer to execute the following processing of:
writing data in a storage device according to a request for writing the data in the storage device;
storing a differential information, indicating whether there is a difference between the data written into the storage device and data stored in a duplicate storage device, in a management information storage unit;
executing a separation copy when the separation copy, which does not allow data rewriting during copying, is requested on the condition that the differential information, stored in the management information storage unit, indicates a difference between the data written into the storage device and the data stored in the duplicate storage device;
judging whether the separation copy is being executed when writing data into the storage device;
storing data to be written into the storage device in a cache memory when the separation copy is being executed; and
writing data stored in the cache memory in the storage device after completion of the separation copy.

* * * * *